United States Patent [11] 3,621,403

[72] Inventor Merle E. Seiy
Fort Wayne, Ind.
[21] Appl. No. 811,286
[22] Filed Mar. 28, 1969
[45] Patented Nov. 16, 1971
[73] Assignee The Magnovox Company
Fort Wayne, Ind.

[54] DIGITAL FREQUENCY MODULATED SWEEP GENERATOR
14 Claims, 2 Drawing Figs.

[52] U.S. Cl. .......... 328/61, 328/44, 328/46, 328/118, 332/16 R;9 R
[51] Int. Cl. .......... H03k 21/36
[50] Field of Search .......... 332/1, 14, 16, 16 T, 23; 328/41, 61, 103, 72, 74, 44, 48, 129, 46; 307/220, 221

[56] References Cited

UNITED STATES PATENTS

| | | | |
|---|---|---|---|
| 3,044,065 | 7/1962 | Barney et al. | 328/41 X |
| 3,238,462 | 3/1966 | Ballard et al. | 328/72 X |
| 3,292,034 | 12/1966 | Braaten | 328/72 X |
| 3,504,290 | 3/1970 | Earle | 328/41 X |
| 3,548,320 | 12/1970 | Roberts et al. | 328/48 X |
| 3,534,269 | 10/1970 | Besemer et al. | 328/44 X |

*Primary Examiner*—Alfred L. Brody
*Attorney*—Richard T. Seeger

ABSTRACT: The invention relates to a frequency modulated sweep generator in which a bistable multivibrator supplies a pulse train at its output. The multivibrator is driven by pulses from a comparator which compares the count on a preset counter with the count on a clock driven counter. Each pulse from the comparator resets the clock driven counter to zero while a memory under the control of an address circuit feeds digital information to the preset counter to vary the count therein to effect frequency modulation of the output of the multivibrator. The address circuit causes the information from the memory to move to a shift register from which it is fed to the preset counter. Pulses from the comparator control the shift register and the address circuit.

INVENTOR.
MERLE E. SEIY
BY
Jeffers and Young

DIGITAL FREQUENCY MODULATED SWEEP GENERATOR

This invention relates to digital frequency modulated (EM) sweep generators and, in particular, to the digital generation of frequency modulated waveforms.

Linear FM sweep generators and digital frequency generators are known in the art but, heretofore, have been lacking in having utility for all purposes. For example, some generators of the nature referred to involve storage registers and shift registers under the control of counters, but have not been arranged to reset the counter after a certain count has been reached. In other cases, the generators have been responsive to input commands derived from a punched tape or a punched card or some other sort of digital input device, such a magnetic tape. In still other cases, such generators have involved analog functions or methods, thus introducing difficulties that are not encountered in the use of digital functions and methods.

Prior art linear FM sweep generators have generally been of the analog type, for example, employing voltage controlled oscillators, either of the sine wave or the square wave type. A linear ramp DC voltage is generated, in connection with such voltage control oscillators, to cause it to sweep through the desired frequency range. All such generators are difficult to stabilize with respect to frequency and are difficult to adjust so as to obtain accurate linear sweeps.

Having the foregoing in mind, it is a primary object of the present invention to provide an improved linear FM sweep generator which is entirely digital in operation and having advantages over what has been provided in the devices known in the prior art.

Another object of the present invention is the provision of such a generator having high-frequency stability as an outstanding characteristic.

Still another object of this invention is the provision of a generator of the nature referred to which has high linearity.

Still another further object of this invention is the provision, in a generator of the nature referred to, of the employment of digital techniques which result in the minimum of bit storage as opposed to what has been possible heretofore.

Figure 1:
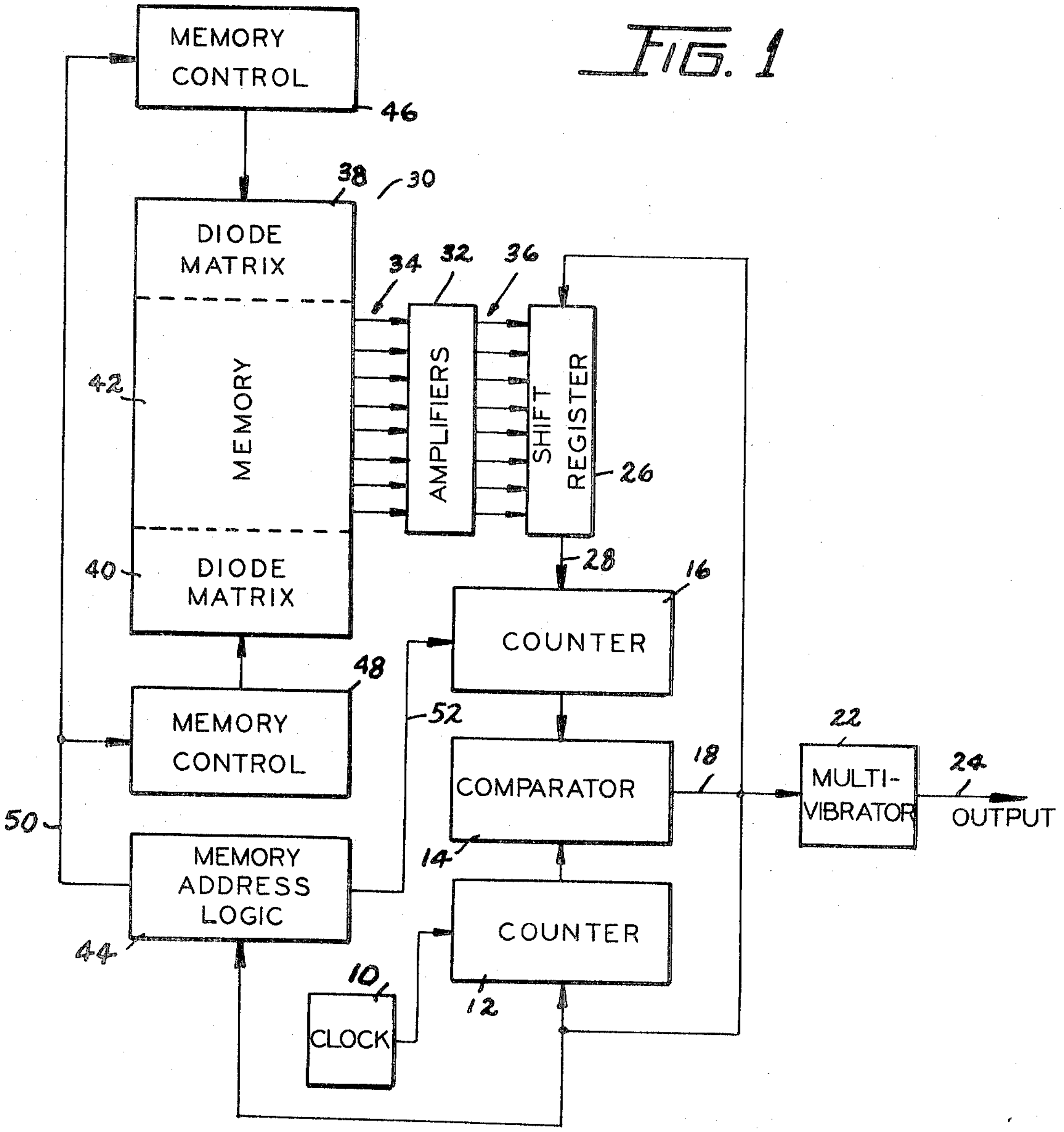
Figure 2:
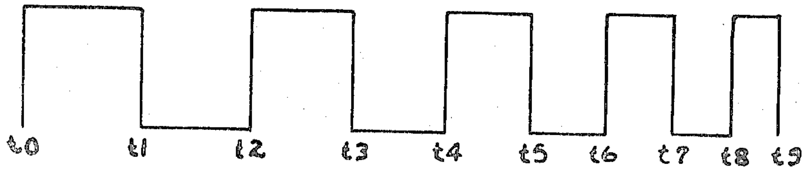

The foregoing objects as well as other objects and advantages of the present invention will become more apparent upon reference to the following embodiment of the invention taken in connection with the accompanying drawings, in which:

FIG. 1 is a block diagram showing a digital linear frequency modulated sweep generator according to the present invention; and FIG. 2 shows a clipped linear frequency modulated waveform as obtained from the output terminal of the generator of FIG. 1.

BRIEF SUMMARY OF THE INVENTION

The present invention relates to a frequency modulated sweep generator and is particularly characterized in that it is digitally controlled throughout and extracts information from a memory storage and transfers it to a shift register for the control of a counter which is compared to a clock actuated counter. The actuation of the generator is under the control of the "zero" crossover information of the signal being generated. The circuit consists of control logic, a memory unit, a memory control logic, a shift register, counters, a comparator, and a bistable multivibrator as an output unit which generates a clipped waveform in response to a signal from the comparator and which signal also controls the logic circuitry pertaining to the memory, to the shift register, and to the counters.

Referring to the drawings somewhat more in detail; in FIG. 1, reference numeral 10 designates a crystal controlled clock running at a certain accurately controlled fixed frequency. The period of the clock is established by the accuracy desired and is the time difference between successive half-wave periods of the frequency function to be generated; which might be on the order, for example, of 1 microsecond. Clock 10 supplies signals to the up counting control terminal of a binary counter 12 and which might, for example, be a 10-bit binary counter.

It will be understood that a bit, as employed herein, refers to a digit having a value of either "zero" or "one" in a binary word. As is known, a 10-bit binary counter can count as high as 1,023 in the binary code. The highest count required of the counter in this application is determined by dividing the longest half-wave period of the frequency function to be generated by the clock period.

Binary counter 12 has a readout terminal connected with a bit comparator 14, also a 10-bit unit, if counter 12 is a 10-bit unit. Bit comparator 14 is also connected to the readout terminal of a second binary counter 16 which, in conformity with comparator 14 and counter 12, is also a 10-bit counter. Counter 12 counts up and has a reset terminal to set all stages to "zero," whereas counter 16 counts down if a linear FM sweep increasing with time is to be generated and has a set terminal to set it to a predetermined initial count. It is obvious that the system may be modified to use an "up-counter" so as to generate an FM sweep output whose frequency decreases with an increase in time, or to use an "up/down-counter" so as to generate alternate periods of decreasing and increasing frequency.

When the count registered by counter 12 in response to signals from clock 10 is equal to the count stored in counter 16, a control pulse is supplied to wire 18 by comparator 14. This control pulse has several functions. The pulse supplied to wire 18 by comparator 14 triggers the bistable multivibrator of flip-flop 22. This circuit component is a bilevel device having a binary output supplying either "one" or a "zero." Which ever state component 22 has at the time of receiving the pulse via wire 18, it flips over to its other state. Thus, if the state of component 22 prior to receiving a pulse is "zero," it goes to a "one" and if it is "one" prior to the pulse it goes to "zero." The multivibrator 22 changes state each time it receives a pulse from wire 18 and this occurs each time the count in counter 12 equals the count in counter 16. In this manner, a square waveform is generated at the output of multivibrator 22, the said output being represented by wire 24. The period of the waveform is equal to the count stored in counter 16 multiplied by the period of the pulse from clock 10.

The pulse supplied to wire 18 by comparator 14 also functions to reset the binary counter 12, with all stages thereof going to "zero" and thus preparing counter 12 to start counting for the next half-wave period of the waveform being developed on wire 24.

Still further, the pulse supplied to wire 18 by comparator 14 supplies an actuating pulse to a shift register 26 to advance the information therein by one stage. Shift register 26 is an eight-stage register and, when actuated by a pulse from wire 18, will supply a subtract "one" to the control lead of counter 16 if a "one" is stored in the final stage or low order position of register 26 indicating the next half-wave period of the frequency function to be generated should be decreased by one clock period, and no actuation if a "zero" is stored in the last, or output, stage of the register indicating there is to be no change in the half-wave period. The control lead at 28 connects the output terminal of register 26 to the down-counting control terminal of counter 16.

The presence of a "one" in the stage of shift register 26 which is shifted out in response to a pulse on wire 18 causes counter 16 to decrement by one which in turn causes the next half-wave period of the output to be one clock period less in duration than its predecessor.

After eight complete signals, all of the information stored in register 26 will be read out and supplied to counter 16 via control lead 28 and it will then be necessary to insert a new eight-bit word into shift register 26.

The particular words referred to are derived from a memory unit 30 via the sense amplifiers indicated at 32 which are disposed between memory 30 and the pertaining stages of register 26 by the wires 34 leading from memory 30 to the respective amplifiers and wires 36 leading from the respective sense or read out amplifiers to the pertaining stages of register 26. While the disclosed memory configuration is a parallel read out system, it is clear that a serial read out could be employed.

The storage at 30 consists of diode matrixes at 38 and 40 and a fixed wire rope memory 42 therebetween adapted for storing 1,600 bits by means of eight cores per word and 200 read-write wires.

The storage or memory 30 is organized as 200, eight-bit words in a magnetic core storage array 42 and has diode decoding matrixes 38 and 40 responsive to memory select control elements 46 and 48 which in turn are responsive to an address in memory address logic 44. Numerous other memory configurations would be possible, such as diode matrix, or magnetic tape or drum storage. Similarly, various modifications within the context of a magnetic core memory are possible.

It will be evident that the information transferred from storage 30 to shift register 26 is transferred in parallel form, but is read out of the register 26 in series form.

A memory address logic unit at 44 is also supplied by pulses from wire 18 and addresses the memory control circuits 46 and 48 via a wire 50 leading from the output of unit 44 to the inputs of the memory control circuits. This addressing is accomplished once for each group of eight signals from comparator 14.

Addressing the proper word is accomplished by transmitting a pulse through one of the 200 write wires by gating the memory control circuits in the proper manner. The unit at 48 consists of eight current drivers and the unit at 46 comprises 25 current switches and is referred to as a write driver. It will be evident that with 25 current switches and eight current drivers, selections can be made among the 200 write wires.

The memory, as mentioned, is a fixed wire rope memory type and stores therein the number of counts, or pulses, of clock 10 required to change the half-wave period during the next interval. For example, in the case of a 600 to 1,000 cycles per second linear frequency modulated waveform with a one cycle per second accuracy requirement, the half-wave period interval changes by a maximum of one bit.

The storage requirements for the memory for each half-wave period will thus be one bit which will be a "zero," or a "one," dependent upon whether a change in the next half-waveform period to be generated is desired. For a one second pulse, a total of 1,600 bits is required.

It will be noted in FIG. 1, that the unit 44 also addresses the counter 16 via an input wire 52 to reset the counter each time the storage is addressed.

Waveforms more complex than the square wave referred to can be generated by increasing the total number of bits stored in memory 42. For each half-wave period to be generated, one bit may have to be used to actuate a control for addition or subtraction and several bits may be required for the desired amount of change required from one half-wave period to the next if complex waveforms are to be generated. The counter 16 must also be designed to be controlled to count up or down as well as change its count by the desired value via the count control pulses received from the shift register.

The circuit according to the present invention has been shown schematically and it will be understood that certain functional elements, such as the initial start and final stop controls, have not been illustrated because they are well known in the art of digital control theory.

Reference to FIG. 2 will show typical waveform supplied by the circuit of FIG. 1, wherein the beginnings and ends of the series of square half waves are denoted T0 through T9.

It will be noted that the period of each half wave is shorter than the preceding one and longer than the next following one giving a frequency modulated wave form that increases in frequency with time. The amplitude of each waveform is the same and each half wave is substantially rectangular with steep front and rear faces and a substantially flat top or bottom.

The foregoing description will make it clear that the present invention is concerned with a completely digital unit in which digital elements of the system are assembled and interconnected so as to implement a signal generator by using the "-zero" crossover information of the signal to be generated.

Referring again to FIG. 1, the device of the present invention generates a highly accurate linear frequency modulator waveform that can be expressed in an equation as a function of time. As mentioned, the waveform shown in FIG. 2, and which may be referred to as clipped linear frequency waveform can be expressed in the following equation in its "unclipped" form:

$$f(t)=A\sin\left[2\pi\left(f_0t+\frac{Kt^2}{2}\right)\right]$$

Where:

$A$=peak to peak amplitude $f_0$=desired starting frequency of the pulse $K$=desired band of frequencies to be swept per second $t$=time in seconds and is the variable function in the equation Note $K$ is positive for a linear sweep that increase in frequency with time and negative if the frequency decreases with time.

The times at which the foregoing function for ($t$) is "zero" are the crossover points and may be found by solving the equation for ($t$) when $f(t)$ is equal to "zero." In the case where $F(t)$ increases with time $f(t)$ will be zero when:

$$\sin\left[2\pi\left(f_0t+\frac{Kt^2}{2}\right)\right]$$

is zero or when:

II. $$2\pi\left(f_0t+\frac{Kt^2}{2}\right)=0\pi,\ 2\pi,\ 3\pi,\ \ldots\ m\pi=\pi n\Big|_{n=0}^{n=m}$$

where $m$ (the total number of crossovers) is determined by III. $M=(2f_0+TK)T$ where $T$ is the desired time over which the frequency is to sweep in seconds.

The next step is to solve equation II for $t$ for all values of $n$ by expressing (II) as a quadratic equation:

IV. $$\pi Kt^2+2\pi f_0t-n\pi=0$$

V. $$t=-\frac{f_0}{K}+\frac{1}{K}\sqrt{f_0^2+nK}\ \text{for}\ n\Big|_{n=0}^{n=m}$$

The half-wave period for a given full cycle of a waveform is found by taking the time difference between two consecutive crossover times and rounding this figure off to the desired accuracy. The needed capacity for the memory is determined by the total number of crossovers and the number of clock periods that the half-waveform period changes in consecutive steps before another sweep of the generator is made.

The generator disclosed in simplified form in the present application is capable of considerable variations. For example, the programming capabilities of the generator can be extended by the use of an auxiliary memory to store further information on the "zero" crossover information of the signal to be generated. This could even result in a reduction in the total memory storage requirement. As an example of the use of such an auxiliary memory, repeated cycles of words to be stored in memory 42 could be determined. A subtraction routine to program an auxiliary memory in which such cyclically occurring information would be stored, could then be arrived at and thereby substantially reduce the required capacity of main memory 42. The main memory in this case, would then consist of the required number of words to generate all of the necessary half-wave period counts of the particular function to be generated, and the auxiliary memory would store the sequence at which the words were to be read out of the main memory.

The device of the present invention could be extended to generate sawtooth frequency modulated pulses, Doppler invariant frequency modulated pulses, and band limited pseudo random pulses, among others.

By replacing the memory unit by a switching function a constant wave (CW) frequency generator could be implemented to generate various high stable continuous wave (CW) signals with a frequency selectable resolution equal to the desired frequency output divided by the clock frequency.

The device of the present invention is particularly adapted for the generation of frequency modulated acoustic signals and a particular application of such a generator is to be found in a linear frequency modulated sonar system. Another application of the device of the present invention would be in connection with supersonic frequencies which could be accomplished by heterodyning the signal generators output. If the signal generator output is transmitted through a band-pass filter a sine wave function will result.

It will be understood that other modifications and adaptations can be made in the invention falling within the scope of the appended claims.

What is claimed is:

1. A frequency modulated sweep generator comprising memory means, shift register means connected to receive information from said memory means and having a control terminal and an output terminal, a first counter having a first counting control terminal supplied from the output terminal of said shift register means and having a readout terminal, a clock having an output terminal, a second counter having an input terminal connected to the output terminal of said clock and also having a readout terminal and a reset terminal, a comparator having input terminals connected to the readout terminals of said first and second counters and having an output terminal at which a pulse is developed when the counts in said first and second counters are equal, and a bistable multivibrator having an input terminal connected to the output terminal of said comparator and having an output terminal at which a square waveform is developed as the multivibrator changes states, said output terminal of said comparator being connected with said control terminal of said shift register and with the said reset terminal of said second counter.

2. A frequency modulated sweep generator according to claim 1, which includes an address logic circuit having an input terminal connected to the output terminal of said comparator and having a first output terminal connected to said set terminal of said first counter.

3. A frequency modulated sweep generator according to claim 2, in which said address logic circuit includes a second output terminal, circuit means for transferring information from said memory means to said shift register, and means connected to said second output terminal of said address logic circuit and to said memory means to cause said circuit means to effect said transfer of information.

4. A frequency modulated sweep generator according to claim 3, in which said circuit means includes an amplifier connecting each stage of said shift register to said memory means.

5. A frequency modulated sweep generator according to claim 4, in which said shift register has a predetermined number of stages and said address logic circuit supplies a signal to each of its said output terminals each time the input terminal thereof is supplied with the same said predetermined number of pulses from the output terminal of said comparator.

6. A frequency modulated sweep generator according to claim 5, in which said first and second counters are 10-bit binary counters.

7. A frequency modulated sweep generator according to claim 6, in which said shift register has eight stages.

8. A frequency modulated sweep generator according to claim 3 in which information from said memory means is transferred along parallel paths from the memory means into respective stages of said shift register.

9. The method of generating a frequency modulated pulse group which comprises: feeding clock pulses to a first counter, comparing the count in the first counter to the count in a second counter, changing the state of a bistable multivibrator each time the counts in said counters are equal whereby the output signal from said multivibrator forms a series of pulses, resetting said first counter to zero contemporaneous with each changing of the state of said multivibrator, and changing the count in said second counter in accordance with digital information stored in a memory unit, said changing occurring in a given direction upon at least some of the changes in state of said multivibrator whereby the series of pulses forming the output signal from said multivibrator is frequency modulated.

10. The method according to claim 9 in which the count in said second counter is decremented to provide an output signal of increasing frequency and incremented to provide an output signal of decreasing frequency.

11. The method according to claim 10 in which said second counter is reset periodically to the original count to provide for a series of frequency modulated pulse groups.

12. The method according to claim 11 in which the program for changing said second counter is stored in said memory unit and the method includes periodically transferring information from the memory in parallel paths into a shift register, transferring the said information in the shift register in step-by-step serial flow therefrom to said second counter, and effecting a step in the transfer from the shift register to said second counter upon each change of state of said bistable multivibrator.

13. A frequency modulated generator comprising:

a. a source of clock pulses;
b. a first counter containing a first number;
c. a second counter containing a second number, and responsive to said clock pulses to change said second number by one;
d. comparator means for comparing said first and second numbers and generating an output in response to equality thereof;
e. bilevel means adapted to produce one of two outputs and responsive to an output from said comparator means to change from one output to the other; and
f. a source of digital information coupled to said first counter and responsive to said comparator output to selectively vary the number contained in said first counter.

14. The generator of claim 13 wherein said source of digital information comprises a shift register effective to shift one position for each comparator output, and a memory unit containing digital information coupled to aid shift register and effective to periodically update the contents of said shift register.